US009724741B2

United States Patent
Albè et al.

(10) Patent No.: US 9,724,741 B2
(45) Date of Patent: Aug. 8, 2017

(54) DRUM, SYSTEM AND METHOD FOR HANDLING LONG ROLLED PRODUCTS COMING FROM DIFFERENT STRANDS OF A ROLLING MILL

(71) Applicant: PRIMETALS TECHNOLOGIES AUSTRIA GMBH, Linz (AT)

(72) Inventors: Roberto Albè, Gorla Minore (IT); Roberto Bianchi, Milan (IT); Ezio Colombo, Milan (IT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 0 days.

(21) Appl. No.: 14/902,994

(22) PCT Filed: Jun. 26, 2014

(86) PCT No.: PCT/EP2014/063487
§ 371 (c)(1),
(2) Date: Jan. 5, 2016

(87) PCT Pub. No.: WO2015/000780
PCT Pub. Date: Jan. 8, 2015

(65) Prior Publication Data
US 2016/0151816 A1  Jun. 2, 2016

(30) Foreign Application Priority Data

Jul. 5, 2013  (EP) ..................................... 13425097

(51) Int. Cl.
B65G 29/02 (2006.01)
B21B 43/00 (2006.01)
(Continued)

(52) U.S. Cl.
CPC .......... *B21B 43/003* (2013.01); *B21F 23/005* (2013.01); *B65G 29/02* (2013.01); *B21B 1/085* (2013.01); *B65G 2201/0217* (2013.01)

(58) Field of Classification Search
CPC ............ B65G 29/02; B65G 2201/0217; B21F 23/005; B21B 43/003; B21B 1/085
(Continued)

(56) References Cited

U.S. PATENT DOCUMENTS 3,497,084 A  2/1970  Murrah ........................... 414/21
3,610,437 A *  10/1971  Barakov ............... B21B 39/002
198/481.1
(Continued)

FOREIGN PATENT DOCUMENTS

CN  1964800 A  5/2007
CN  101208164 A  6/2008
(Continued)

OTHER PUBLICATIONS

International Search Report dated Aug. 13, 2014 issued in corresponding International patent application No. PCT/EP2014/063487.
(Continued)

*Primary Examiner* — Mark A Deuble
(74) *Attorney, Agent, or Firm* — Ostrolenk Faber LLP

(57) ABSTRACT

A drum (10,12) for receiving, transporting and discharging long metal products (P), such as bar or the like, preferably coming from a hot rolling mill: the drum includes at least one pair of channels (C1-C2) extending longitudinally axially and the channels being around the circumference of the drum, the channels simultaneously receive two long products (P1,P2), respectively one long product in each one of the channels that is part of the pair. Also a method and a system for handling long rolled products coming from different strands of a rolling mill are disclosed.

13 Claims, 6 Drawing Sheets

(51) Int. Cl.
*B21B 1/085* (2006.01)
*B21F 23/00* (2006.01)

(58) Field of Classification Search
USPC .......................................................... 198/723
See application file for complete search history.

(56) References Cited

U.S. PATENT DOCUMENTS

| | | | |
|---|---|---|---|
| 3,621,696 A | 11/1971 | Norlindh | |
| 4,054,047 A * | 10/1977 | Sclippa | B21B 43/003 |
| | | | 198/450 |
| 5,301,794 A | 4/1994 | Tomasetig | |
| 5,501,314 A | 3/1996 | Tomat et al. | 198/418.1 |
| 5,944,478 A * | 8/1999 | Colombo | B65G 57/081 |
| | | | 414/742 |
| 6,192,729 B1 | 2/2001 | Offoiach | 72/250 |
| 7,219,521 B1 * | 5/2007 | Eldredge | B21B 43/003 |
| | | | 198/450 |
| 7,475,524 B2 | 1/2009 | Bordignon et al. | |
| 2007/0234774 A1 * | 10/2007 | Bordignon | B21B 39/002 |
| | | | 72/200 |
| 2013/0074567 A1 * | 3/2013 | Eldredge | B21B 39/20 |
| | | | 72/201 |
| 2014/0352383 A1 * | 12/2014 | Castellani | B21B 43/003 |
| | | | 72/201 |

FOREIGN PATENT DOCUMENTS

| | | |
|---|---|---|
| EP | 0 553 930 A1 | 8/1993 |
| EP | 1 877 203 B1 | 12/2011 |
| IT | 1 225 986 | 12/1990 |
| IT | A000149 | 7/1993 |
| WO | WO 98/31483 A1 | 7/1998 |
| WO | WO 02/070156 | 9/2002 |
| WO | WO 02/070156 A1 | 9/2002 |
| WO | WO 2007/003331 A1 | 1/2007 |

OTHER PUBLICATIONS

Written Opinion dated Aug. 13, 2014 issued in corresponding International patent application No. PCT/EP2014/063487.
European Search Report dated Oct. 28, 2013 issued in corresponding European patent application No. 13 42 5097.
First Office Action with Search Report dated Oct. 8, 2016 in corresponding Chinese Patent Application No. 201480038241.3 (with English language translation)(total 21 pages).
Notice of Opposition dated Jan. 11, 2017 issued in European Patent No. 2821154.
Japanese Office Action, dated Apr. 10, 2017, issued in corresponding Japanese Patent Application No. 2016-522492. Partial English translation. Total 5 pages.

* cited by examiner

DRUM, SYSTEM AND METHOD FOR HANDLING LONG ROLLED PRODUCTS COMING FROM DIFFERENT STRANDS OF A ROLLING MILL

CROSS-REFERENCE TO RELATED APPLICATIONS

The present application is a 35 U.S.C. §§371 national phase conversion of PCT/EP2014/063487, filed Jun. 26, 2014, which claims priority of European Patent Application No. 13425097.6, filed Jul. 5, 2013, the contents of which are incorporated by reference herein. The PCT International Application was published in the English language.

TECHNICAL FIELD

The invention concerns a drum and a method for handling rolled long products coming from different strands of a rolling mill. The invention also concerns a system incorporating such a drum.

TECHNICAL BACKGROUND

The invention may be used particularly, but not exclusively, in hot-rolling plants for the production of ferrous long products such as bars, rods or the like.

In order to produce finished long metal products such as bar, rod or the like, a long metal plant comprises, among other devices, a plurality of rolling stands aligned along a rolling line to continuously roll billets received from a furnace or other like source.

After the last rolling stand, the product is generally cut in bar segments which are subsequently cooled at ambient temperature, for example in a cooling bed.

The long product can be discharged on the cooling bed by an apparatus called a drum.

A long product production plant can be configured to simultaneously process a plurality of strands. The strands are obtained by dividing or slitting the product when it is still hot at a given point of the plant after a given number of rolling passes. The slitting is used in order to increase the production rate of a plant without increasing rolling speed of the last stands. After this slitting operation, the long metal product is divided in different strands which need to be subsequently treated.

In document EP 1 8 77 203 B1, in order to be able to process long products segments coming from different production strands, at least two drums per strand are provided. Each drum alternately receives one segment of the long product which has been previously cut. This means that two drums are allocated per strand of product. Furthermore, switching means for directing the long product segments in the appropriate drum are needed. The above mentioned elements make the equipment rather complicated, increase its complexity and require a high amount of maintenance.

Document WO 02 070156 A1 discloses a device for receiving and discharging bars coming from a rolling mill. In this document, two pairs of drums are used to handle the bars coming from a single strand. This means again that two pairs of drums are allocated per strand, which implies that four drums are needed per strand of product.

SUMMARY OF THE INVENTION

A major objective of the invention is to simplify the handling of bars originating from different strands of a rolling mill before loading the bars on a cooling apparatus.

A companion objective of the present invention is to reduce the number of drums, driving systems, and switches needed for handling bar segments coming from a plurality of strands.

Other objectives of the invention are to increase the production rate of a rolling mill plant and to obtain a more compact plant.

The above mentioned problems are solved by a drum for receiving, transporting and discharging long metal products such as bars, rods or the like, preferably coming from a hot rolling mill. The drum includes at least one pair of channels opening on the circumferential periphery of the drum and the channels extending parallel to the drum axis. The at least one pair of channels is arranged to simultaneously receive two long products, one long product respectively in each one of the channels of the pair.

Other optional features of the invention taken alone or in combination are now described.

The drum comprises a plurality of pairs of the channels, wherein each of the pairs of the channels is spaced apart relative to the neighboring pairs of channels.

Each pair of channels on the drum periphery is angularly spaced apart from the neighboring pairs of channels by an angle greater than or equal to 12° and preferably comprised between 12 and 45°.

Each pair of channels is spaced apart relative to the neighboring channels by a portion of the drum periphery that is free of channels. The portion free of channels has an angular width α comprised between 12 and 18°.

Each channel of each pair of channels has a first size, and between each of the pairs of channels, there is a channel having a second size different from the first size. The angular width and the depth of each channel having the second size are respectively greater than the angular width and the depth of each channel having the first size.

Each channel extends along a longitudinal axis of the channel that is parallel to the drum axis. The angular distance between two axes of a pair of channels is bigger than or equal to 30°, and preferably comprised between 30° and 45° degrees. The angular distance between two channels of a pair depends on the linear distance between the two long products that the pair of channels is intended to receive.

The angle B between two channels of a pair is between 14 and 24°, and preferably between 16 and 20°.

The invention also concerns a system for handling a plurality of long products preferably coming from a plurality of strands of a hot rolling mill. The system comprises:
a. at least one drum as above defined,
b. at least one cover intended to cooperate with each channel of the drum to form a chamber to momentarily confine each long product in the channel,
c. at least one guide having at least two entry sections leading to a common exit section of the guide for the two long products, The entry sections are configured to receive and guide at least two long products coming from two different strands of a rolling mill toward the exit section The exit section faces the entries of the channels of the drum and are intended to align in a parallel manner at least two long products before their introduction into the channels of the drum, and
d. a brake for braking the two parallel long products coming from the guide into respective channels.

The invention also concerns a method for handling at least two long products preferably coming from two different strands of a rolling mill. The method comprises the steps of:

a) simultaneously introducing the at least two long products in different channels in the periphery of the same drum and b) subsequently discharging the at least two long products into a same notch of a cooling bed.

Advantageously prior to step a), the method comprises the steps:

guiding the at least two long products so as to align the two long products in a parallel manner and braking the at least two long products.

The invention provides a drum able to simultaneously handle at least two bars in a simple manner and therefore to minimize the number of drums needed to process multiple strands in a rolling mill plant.

The drum according to the invention is particularly advantageous in case where there are a plurality of strands coming from the rolling mill but can also be used where only one strand is provided.

BRIEF DESCRIPTION OF THE DRAWINGS

The teachings of the present invention can be readily understood by considering the following non-limiting detailed description in conjunction with the accompanying drawings, in which.

To facilitate understanding, identical reference numerals have been used, where possible, to designate identical elements that are common to the figures.

Further, as in a same drawing the drums are most of the time identical all reference numbers for one drum have not been reproduced twice for sake of clarity.

DESCRIPTION OF EMBODIMENTS

Figure 1:
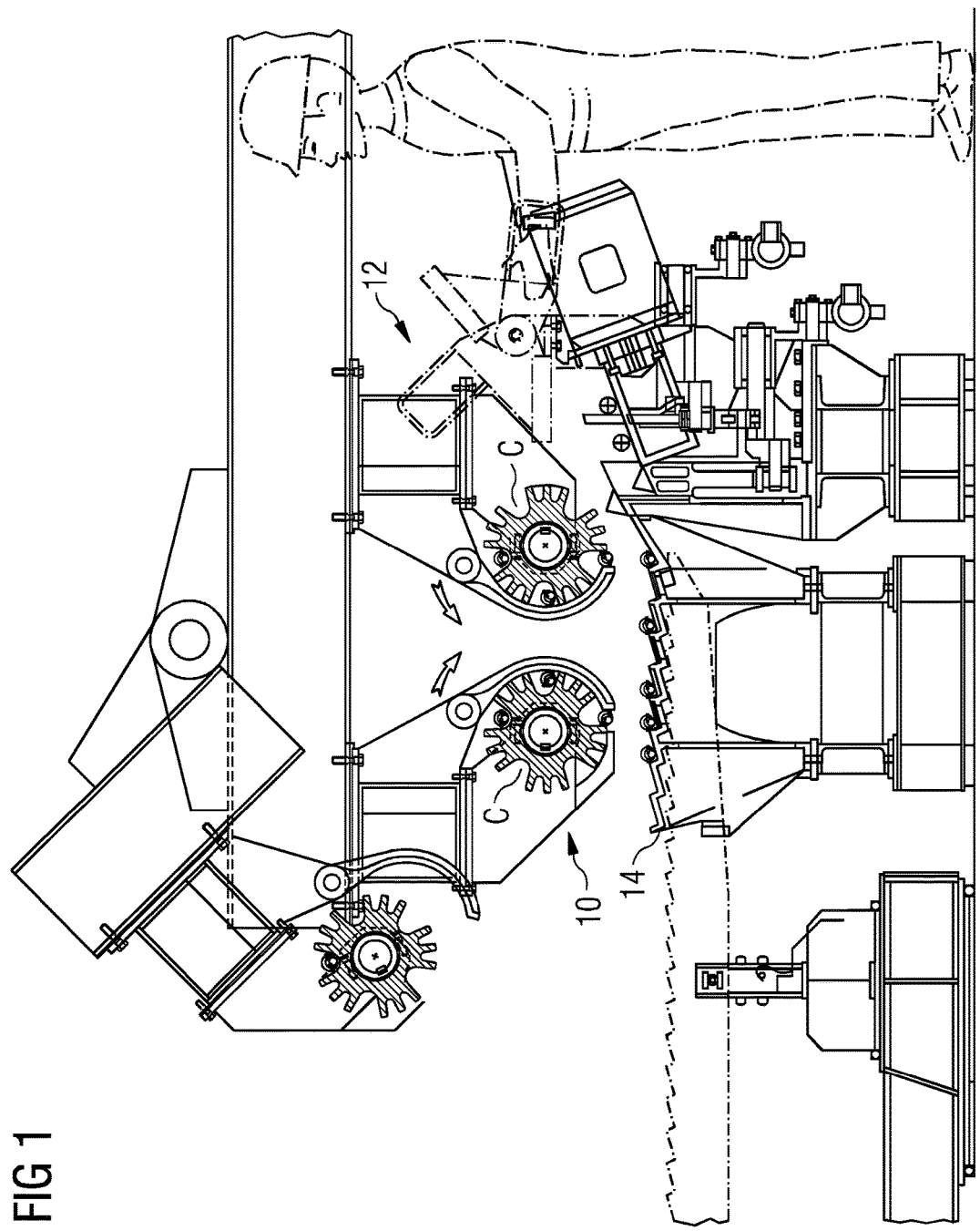
FIG. 1 shows a transverse cross-section of drums according to the invention located above a cooling bed, wherein the drums are loaded with long products having a first diameter.
Figure 2:
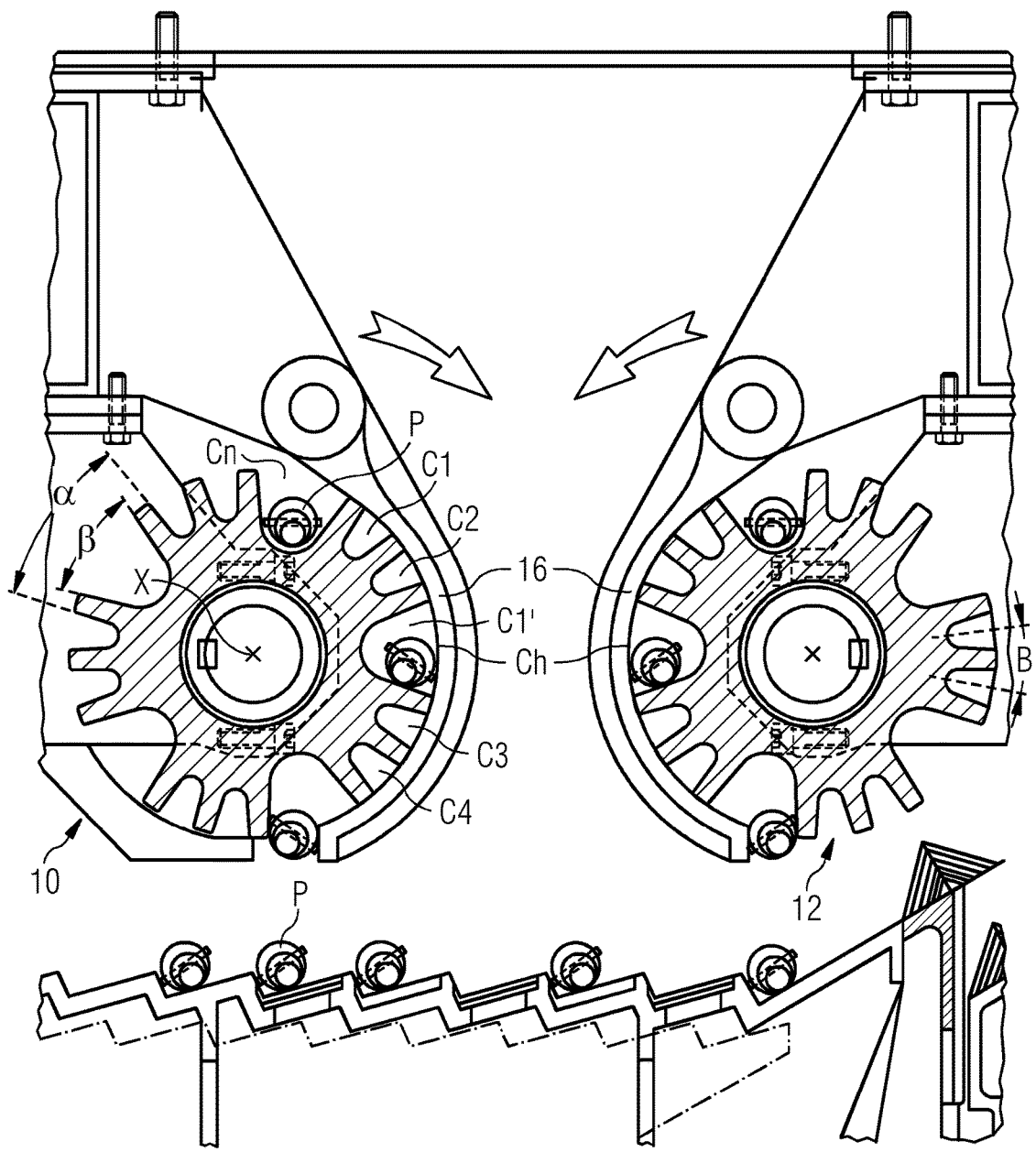
FIG. 2 is an enlargement of a fragment of FIG. 1.

FIGS. 1 and 2 show generally a pair of drums 10 and 12 located above a cooling bed 14. Each drum 10 or 12 has a cylindrical shape and is driven to rotate step-wisely about its axis X. Each drum 10, 12 has a periphery and defines a plurality of channels C1 to Cn. Each channel C1-Cn extends along and parallel to the axis of its respective drum 10 or 12 and the channels are arrayed around the circumference of the drum.

Figure 3:
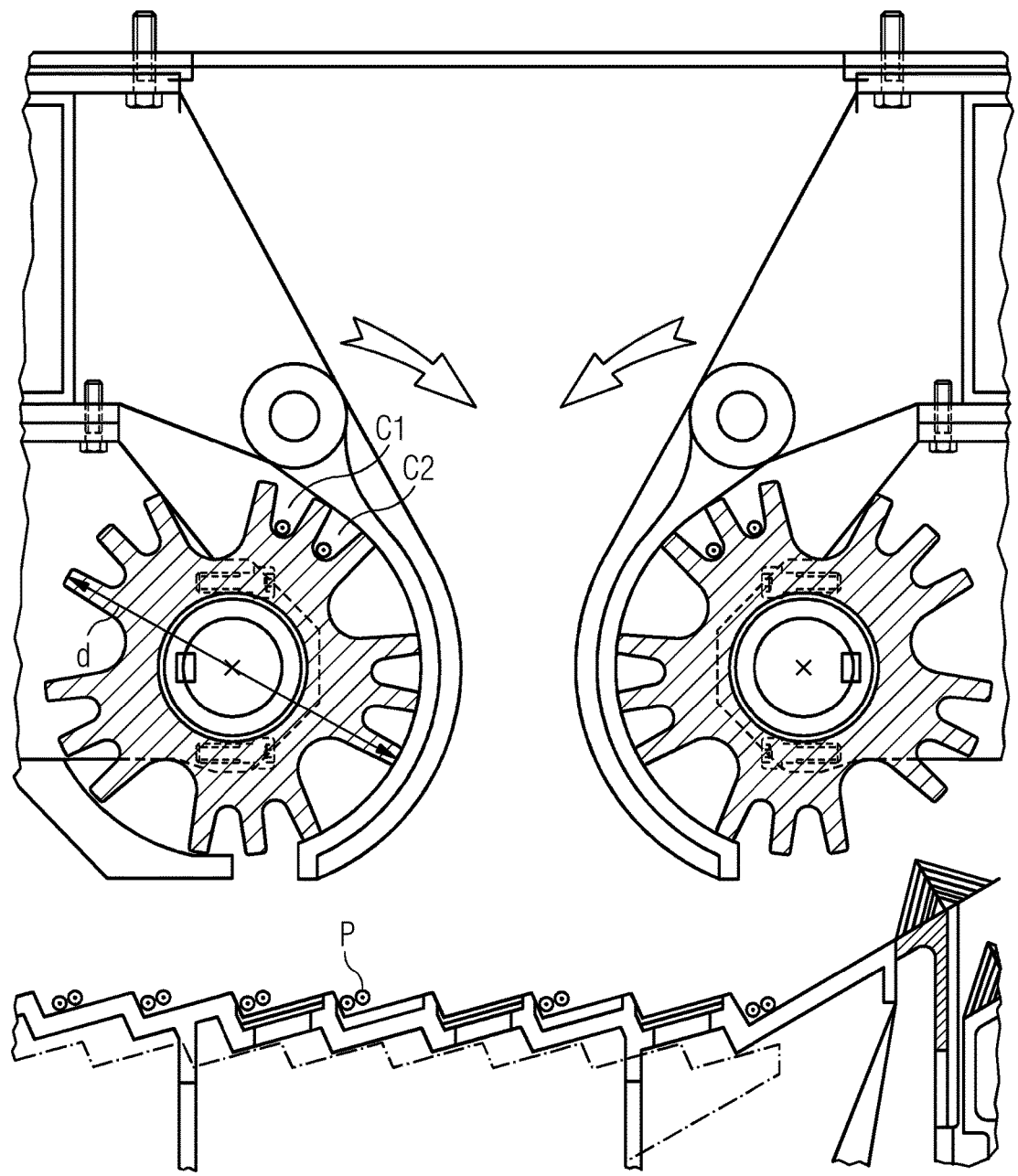
FIG. 3 is a view similar to FIG. 2 where the drums are loaded with long products having a second diameter shown as a smaller diameter.
Figure 6:
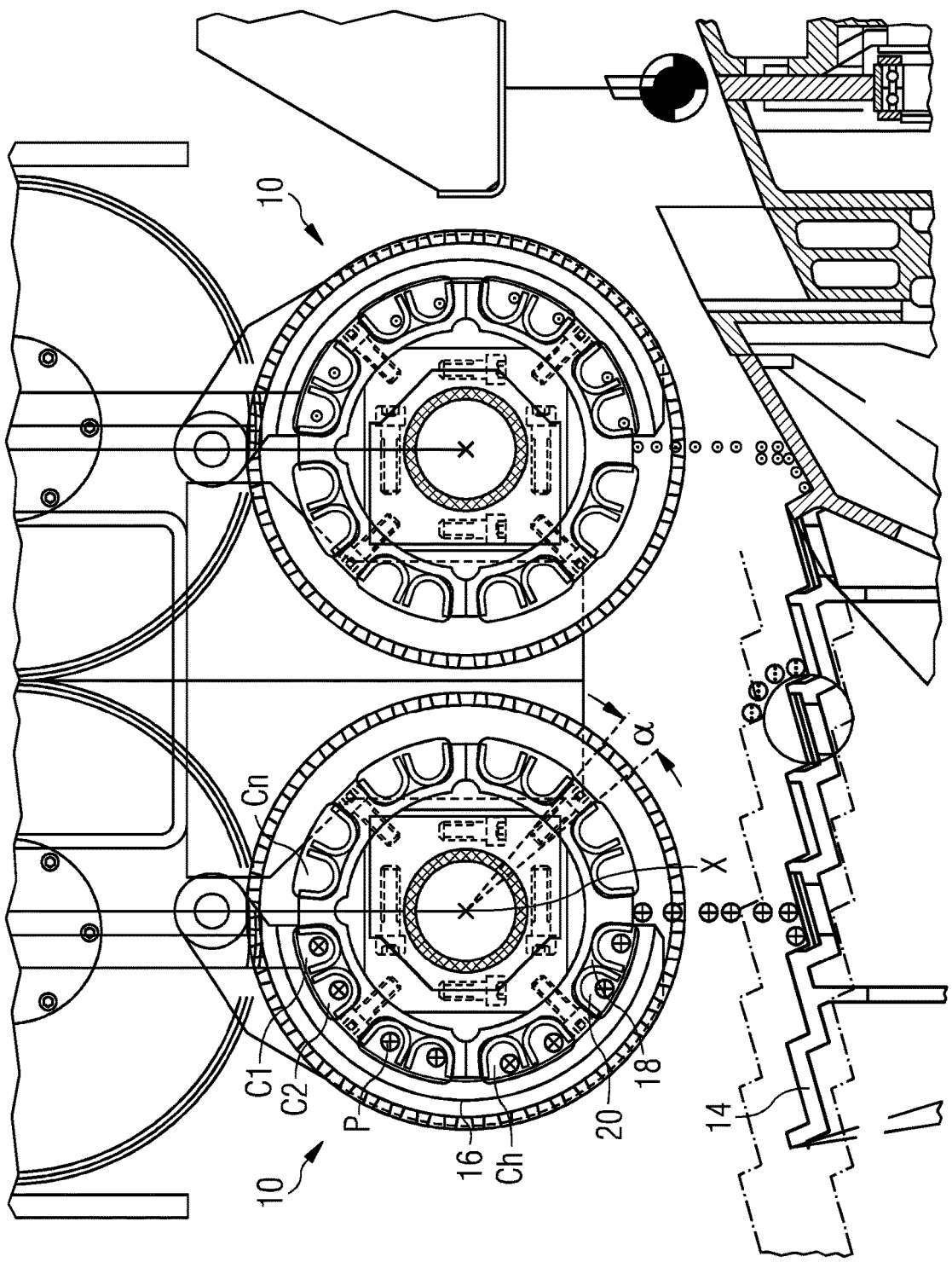
FIG. 6 is a cross-sectional transverse view of a second embodiment of drums according to the invention.

As shown in FIGS. 2,3 and 6, each channel C1-Cn is preferably configured to cyclically receive one long product P coming from a rolling mill at a time.

Each drum also cooperates with a cover 16 fixed in place and extending partially around and spaced outside the drum 10 or 12. The cover 16 is arranged to momentarily close both channels C1-Cn and to form with each closed channel C1 to Cn a chamber Ch wherein each long metal product P is confined before being discharged onto the cooling bed 14.

Each cover 16 extends on a given angular segment with its vertex at the center X of the drum 10 or 12.

According to the invention, in order to be able to handle long products coming from different strands which are obtained for example by a slitting process, each drum 10 or 12 comprises at least two channels C1-C2 in its periphery, forming a pair of channels. Each channel of the pair is located close enough, one channel relative to the other, such that, both channels of the pair can simultaneously receive one long product at time. In other words, the pair of channels simultaneously receives two long products, with one long product in each one of the channels of the pair.

The angle B (see FIG. 2 drum 12) between two channels of a pair, which can be defined as being the angle between the axes of the channels of a pair measured from the vertex on axis X of the channel, depends on the linear distance C (see FIG. 5) between the two long products before their entrance into each pair of channel. That angle may for example be between 14 and 24°, and preferably between 16 and 20°. In one embodiment B is 18°.

In FIGS. 2, 3 and 6, each drum 10 or 12 is comprised of a plurality of pairs of the channels as above defined. Each pair of channels is angularly spaced apart relative to the neighboring pair of channels by a predetermined angle $\alpha$ (with a vertex at the center X of the drum 10 or 12). This angle can be for example bigger than or equal to 30°. In the embodiment of FIG. 2, $\alpha$ is preferably between 30 and 45°. In one embodiment, $\alpha$ is 42°. Of course, this angle depends on the diameter of the biggest product to be handled and on the maximal rotational speed of the drum.

In the embodiment shown in FIG. 6, each pairs of channels is angularly spaced apart relative to its neighboring channels by a portion free of channel. This portion has an angle $\alpha'$ (with a vertex at the center X of the drum 10 or 12) which may be for example bigger or equal to 12° and preferably between 12° and 18°. In one embodiment $\alpha'$ is 15°. More precisely, each drum defines a plurality of longitudinal recesses 18. Each recess 18 has a pair of U shaped half tubes, and each U shaped half tube is a channel intended to receive a long product.

The arrangement of the two channels (for example C1 and C2) part of a pair close to each other also allows discharging two long products in the same notch of the cooling bed 14 as can be seen on FIGS. 3 and 6.

The channels of a pair thereof have generally the same or a quite similar transverse cross section.

Figure 4:
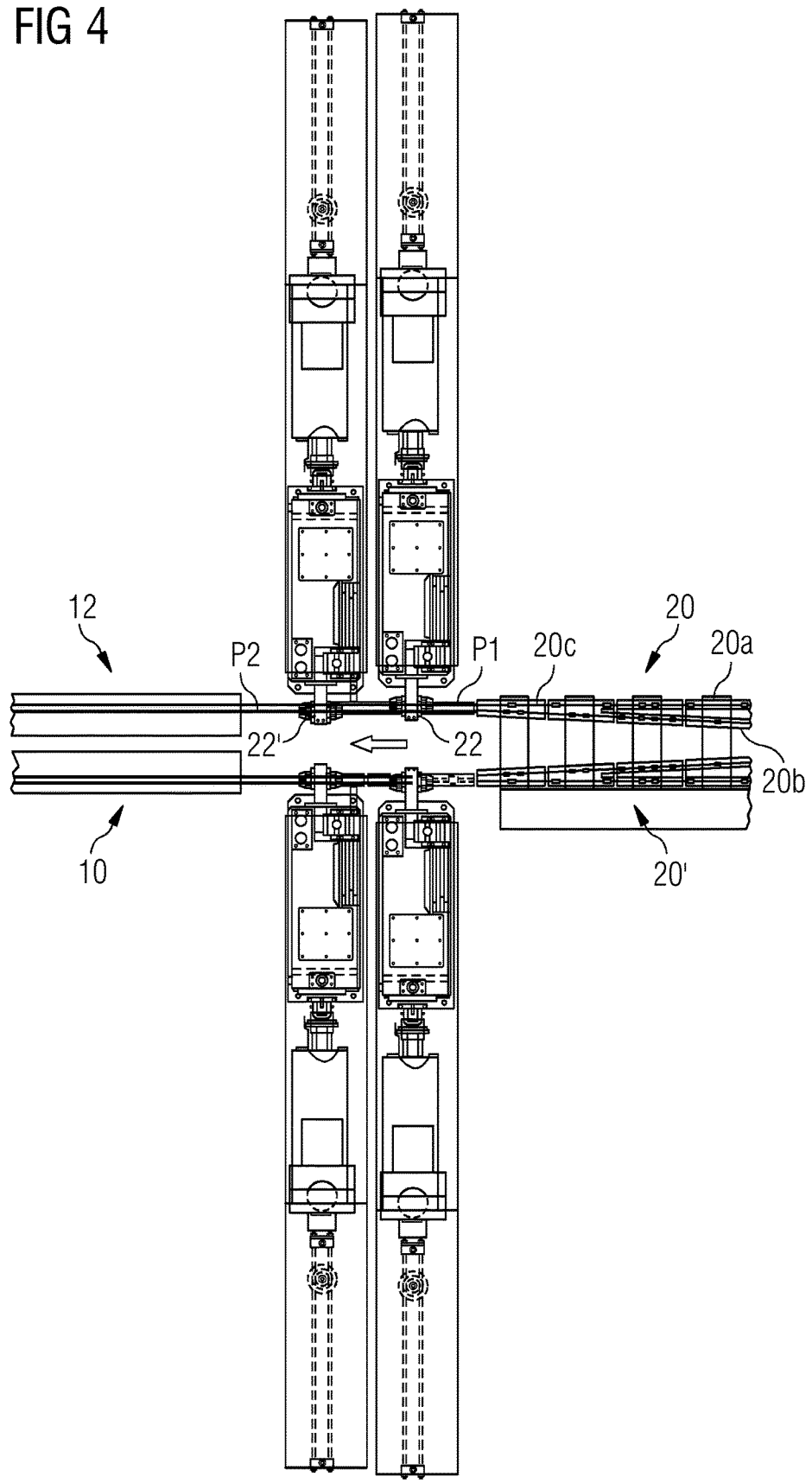
FIG. 4 is a schematic view of a first embodiment of a system for handling a plurality of strands of long products coming from a rolling mill.

In the embodiment shown FIGS. 2 to 4, each drum comprises between each pair of channels, for example between channels C1-C2 and between channels C3-C4, a channel C1' having in a transverse cross section of the drum a shape different than the shape of the channels, for example C1-C4, part of a pair. In this embodiment, each drum has two different types of channels with two different sizes.

The channels with the first size, called small channels (for example C1-C4), are shaped to receive long products with, for example, a diameter of up to 16 mm and with the second size of channel, called big channels (for example C1'), are designed to receive long products with for example a diameter greater than 16 mm up to for example 42 mm. The angular width $\beta$ and the depth "d" of each big channel are respectively greater than the angular width and the depth of each small channel.

In addition to the fact that a drum according to the invention can process a plurality of strands at the same time, the different sizes of its channels also allow widening the range of long products which can be handled by a drum according to the invention in contrast to a known drum. The same drum can process different kinds of long products having a wide range of diameters.

Furthermore, the fact that the sizes of the channels are adapted to the size of the product guaranties the stability of the product during its travel within the channel.

In addition, when traditional drums are used, the long products introduced into the channel cause wear. In case the wear occurs in a channel designed for a long product having an important diameter, for example greater than 32 mm, the wear changes the channel shape. This can lead to blocking subsequent long product having a smaller diameter using the same channel. This problem is avoided with the drum according to the invention because dedicated channels for small diameter long products and for larger diameter long products are provided. In this way, all kinds of products are always well guided, even when wear occurs in one of the channels.

Furthermore, under certain circumstances the use of a drum according to this embodiment may allow to avoid the use of aprons normally needed upstream of the cooling bed in the prior art solutions.

FIG. 4 is a schematic view showing a system for handling a plurality of strands of long products preferably coming from a rolling mill according to the invention. In a first embodiment, this system comprises at least one drum 10 or 12. Upstream of each drum 10 or 12 there is a guide 20 or 20'. Each guide 20 or 20' has a "V" shape, which comprises two spaced apart branches or entering portions 20a, 20b converging toward an ending branch or ending portion 20c. During operation of the rolling mill, each spaced apart branch receives segments P1 or P2 of long product coming from two different strands of the rolling mill. Each branch 20a, 20b guides a respective long product segment toward the guide ending portion 20c where the two long product segments P1 and P2 are aligned in a parallel manner. Subsequently, each long product segment P1 and P2 is introduced simultaneously into a pair of channels of the drum by a braking pinch roll 22 or 22'.

As above shown, the drum 10 or 12 according to the invention is arranged for and capable of cooperating with a system simultaneously delivering two parallel long products coming from two different strands of a rolling mill.

In the embodiment shown in FIG. 4, each braking pinch roll 22, 22' is a single groove pinch roll and is driven by one motor (not shown).

Figure 5:
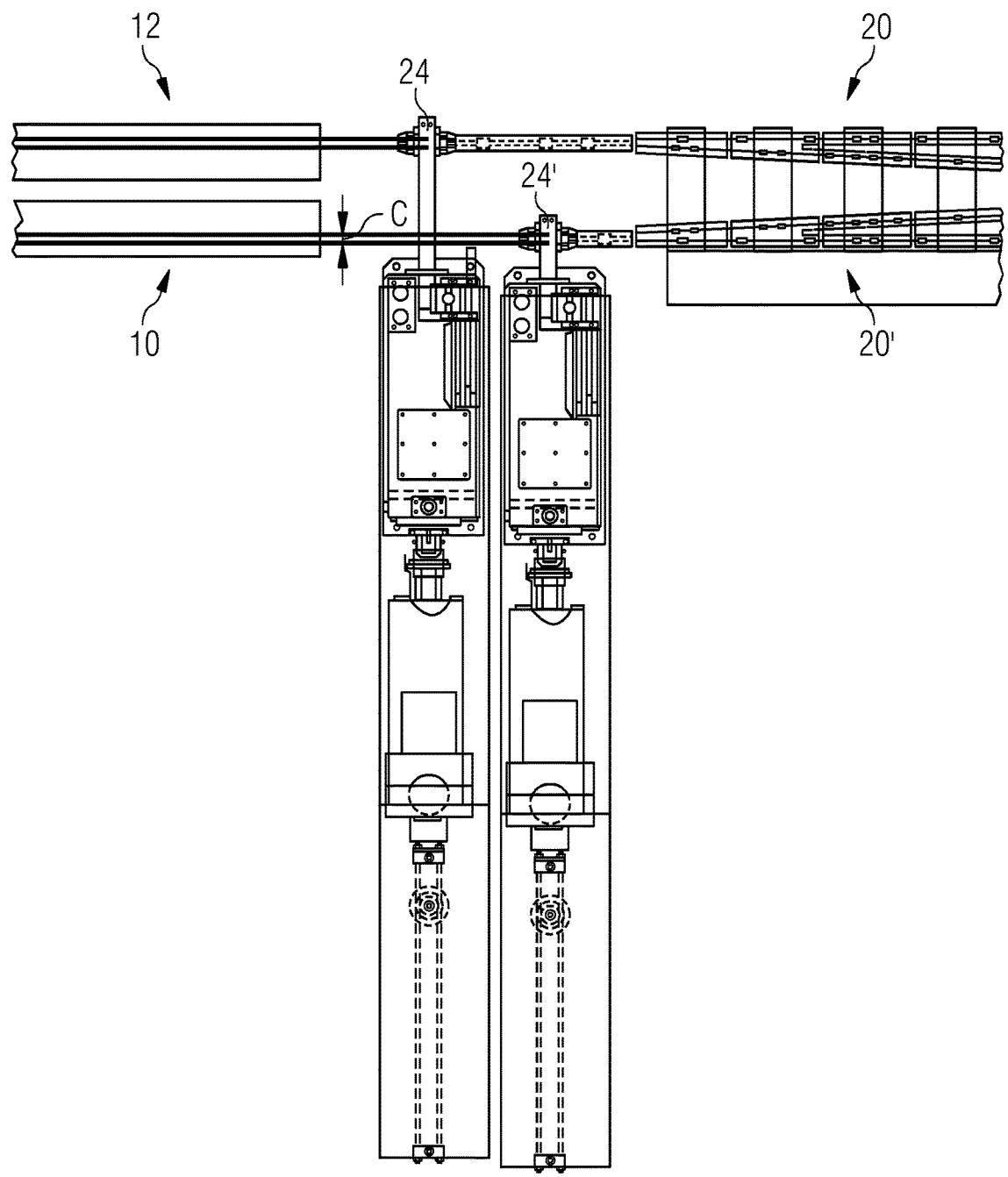
FIG. 5 is a schematic view of a second embodiment of a system for handling a plurality of strands of long products coming from a rolling mill.

In the embodiment shown in FIG. 5, a single double groove braking pinch roll 24 or 24' is used to introduce both strands within the pair of channels 10 or 12, the pinch role 24 or 24' being driven by a single motor (not shown). This embodiment may be used in cases where the available space is limited at this location of the plant.

As can be seen in FIGS. 2, 3 and 6, after introduction of a pair of small diameter long products, or of one big diameter long product, each drum is rotated step-wise and delivers a pair of long products at one time on the cooling bed or one big diameter long product at time on the cooling bed.

Even if it is not shown, it is understood that the system according to the invention comprises control means driving the rotation of the drum such that a pair of channel are facing the charging means 20, 22 and 22' and also synchronizing the pinch roll braking and the motions of the cooling bed to move the discharged long products forward.

When two long products coming from two different strands of a rolling mill arrive in the handling system (driven by upstream pinch rolls not shown in the Figures) according to the invention, they are in a first step guided by the two entry sections 20a and 20b of the guide 20 or 20'.

In a second step, the two long products are aligned in a parallel manner by the exit section 20c of the guide 20 or 20'.

In a third step, the two long products are braked by the pinch rolls 22,22' and are introduced into a pair of channels of the drum 10 or 12 facing the pinch rolls.

In a fourth step, the drum 10 or 12 is driven to rotate by one step such that two long products, which were previously confined in two chambers Ch closed by the cover 16, are discharged by gravity on the same notch of the cooling bed 14.

The invention claimed is:

1. A drum for receiving, transporting and discharging long metal products (P), the drum comprising:
   the drum having an axis;
   a plurality of pairs of channels, the channels of each pair of channels being circumferentially spaced apart, each channel of a respective pair of channels extending longitudinally parallel to the drum axis, at least one pair of channels of the plurality of pairs of channels being configured to simultaneously receive two long products, with one long product respectively in each one of the channels of the at least one pair of channels and the at least one pair of channels are configured to subsequently discharge the at least two long products on notches of a cooling bed,
   wherein each pair of the plurality of pairs of channels is circumferentially spaced apart from a neighboring pair of channels by a first angle that is not more than 45°, and
   wherein each channel in the at least one pair of channels is angularly spaced from another channel in the at least one pair of channels by an angle in the range 14° to 24°.

2. A drum according to claim 1, wherein each pair of channels is spaced apart relative to a neighboring pair of channels by a portion free of a channel.

3. A drum according to claim 2, wherein the portion free of a channel has an angular width α comprised between 12° and 18° degrees.

4. A drum according to claim 1, wherein each channel of each pair of channels has a first size, and wherein the drum further comprises between each of the pairs of channels another channel having a second size different from the first size.

5. A drum according to claim 4, wherein an angular width (β) and a depth (d) of each channel having a second size are respectively greater than the angular width and the depth of each channel having the first size.

6. A drum according to claim 1, wherein each channel extends along a longitudinal axis parallel to the drum axis (X), and wherein the circumferential distance between two axes of a pair of channels is larger than or equal to 30° and less than or equal to 45°.

7. A drum according to claim 1, wherein an angular distance between the at least one pair of channels depends on a linear distance between the two long products that the at least one pair of channels is to receive.

8. A drum according to claim 1, wherein the long metal products are bars or rods.

9. A system for handling a plurality of long products from a plurality of strands of a hot rolling mill, the system comprises:
   a. at least one drum having an axis;
   b. at least one pair of circumferentially spaced apart channels, each channel extending longitudinally parallel to the drum axis, the at least one pair of channels being configured to simultaneously receive two long products, with one long product respectively in each one of the channels of the at least one pair of channels and the at least one pair of channels are configured to subsequently discharge the at least two long products on notches of a cooling bed;

c. at least one cover configured to cooperate with each channel of the drum to form a chamber to momentarily confine each long product for an angular distance around the drum and the at least one cover is located after the long products are delivered to the channels and before the long products are to leave the channels to enter the cooling bed;

d. at least one strand guide having at least two entry sections located next to one another, and the entry sections leading to a common exit section of the at least one strand guide, the entry sections being configured to receive and guide at least two of the long products coming from two different strands of a rolling mill toward the exit section, and wherein the exit section of the strand guide faces of the channels of the drum and the exit section is configured to align in a parallel manner the at least two long products before their introduction into the channels of the drum, and e. a brake for braking the two parallel long products coming from the strand guide.

10. A method for handling at least two long products coming from two different strands of a rolling mill, the method comprising the following steps:

a) providing a drum having an axis and more than four circumferentially spaced apart pairs of channels, each channel of each pair of circumferentially spaced apart channels extending longitudinally parallel to the drum axis and each pair of channels configured and arranged on the drum to simultaneously receive two long products, with one long product respectively in each one of the channels thereof and configured to subsequently discharge the at least two long products on notches of a cooling bed;

b) introducing the at least two long products in different channels of the same drum simultaneously and c) subsequently discharging the at least two long products on notches of a cooling bed.

11. A method according to claim 10, comprising prior to step a):

guiding the at least two long products to align the two long products in a parallel manner and, then braking the at least two long products.

12. A method according to claim 11, using a drum, wherein an angular width ($\beta$) and a depth (d) of each channel have second sizes which are respectively greater than the angular width and the depth of each channel having the first size.

13. An apparatus comprising a cooling bed and a drum for receiving, transporting and discharging long metal products coming from a hot rolling mill, said drum comprising more than four pairs of circumferentially spaced channels extending parallel to the drum axis, each said pair of channels being configured and arranged on the drum to receive simultaneously two long products from the hot rolling mill, respectively one long product in each one of the channels, wherein each said pair of channels is arranged to subsequently discharge said at least two long products on a same notch of a cooling bed.

\* \* \* \* \*